United States Patent Office 3,072,781
Patented Jan. 8, 1963

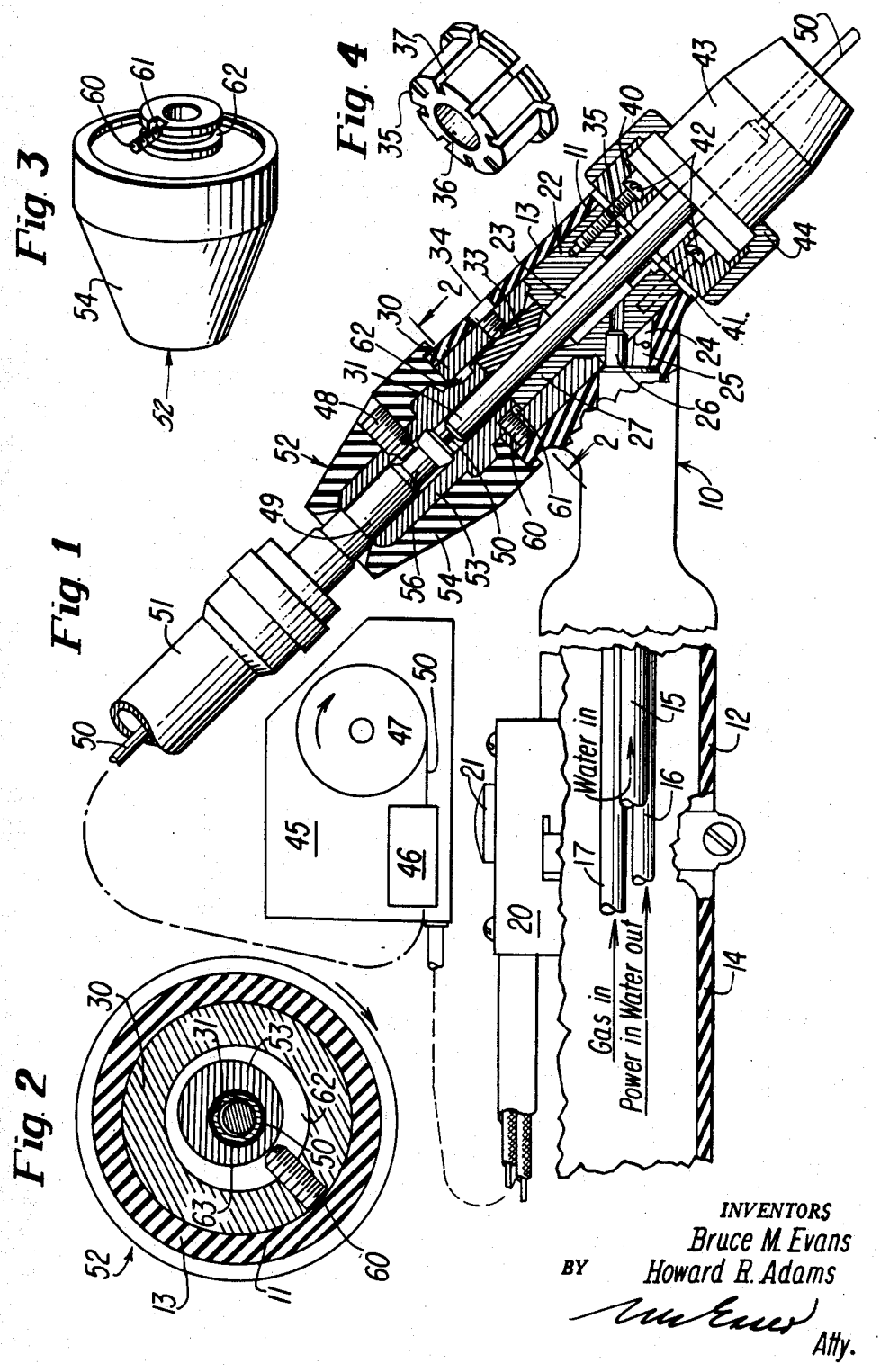

3,072,781
ARC WELDING APPARATUS
Bruce M. Evans and Howard R. Adams, Chicago, Ill., assignors to Chemetron Corporation, Chicago, Ill., a corporation of Delaware
Filed Oct. 25, 1960, Ser. No. 64,850
7 Claims. (Cl. 219—130)

This invention relates to arc welding apparatus, and more particularly to a welding torch for semi-automatic welding with consumable electrode material.

Torches of this character are generally provided with a conduit, usually flexible, for transferring electrode from a wire drive unit to the torch. The electrode is then directed through the torch by means of a guide tube. The guide tube must be changed frequently due to wear, change in electrode size, "burnbacks," etc. Also, as electrode passes through the conduit and guide tube during welding, jamming may occure due to kinks in the electrode, metal shavings from the electrode, etc. A quick positive and simple means of disconnecting the conduit from the torch has thus been a major problem.

It is therefore a principal object of the present invention to remedy the problem referred to above, to reduce the down time required for clearing jams and cleaning out the guide tube, and to provide a simple positive connection means between the wire conduit and the torch head which can be manually disconnected without the use of tools.

Additional objects and features will become apparent as the following description proceeds taken in conjunction with the accompanying drawing in which:

FIG. 1 is a fragmentary sectional view of arc welding apparatus according to the preferred embodiment of the present invention;

FIG. 2 is a sectional view taken along the line 2—2 of FIG. 1;

FIG. 3 is a perspective view illustrating the mode of operation of certain of the elements of FIG. 1; and FIG. 4 is a perspective view showing details of one of the elements of FIG. 1.

Briefly stated, the present invention provides a manually rotatable connector cap mounted on the end of a wire conduit adapted for quickly connecting the conduit to a torch head. The torch head is provided with a conformation consisting of a projecting pin arranged to be received and engaged by a cooperating groove conformation on the connector cap of the conduit. The groove has a cam-like peripheral surface which is in eccentric relation to the axis of rotation of the connector cap and which is therefore engageable with the projecting pin on partial rotation of the cap. Thereafter, the connector cap may be disconnected readily from the torch head without the use of tools merely by manually rotating the cap and separating the parts.

Referring now more particularly to FIG. 1, there is shown a portable hand welding torch 10 having a head assembly 11 and a tubular handle 12. The head 11 and the handle 12 are covered by insulators 13 and 14, respectively, of suitable non-conducting material.

Enclosed by the handle 12 are an incoming water conduit 15, an outgoing water and power conduit 16, and a shielding gas conduit 17. A switch and cable assembly 20 provided with a trigger switch button 21 is attached to the handle 12.

Describing now the head portion of the torch 10, a head insert assembly 22 is enclosed within the insulator 13. The head insert assembly 22 is fabricated from suitable conducting metal and is generally tubular in shape having a central passageway 23. The conduits 15, 16 and 17 are connected to head insert assembly 22 by water tubes 24, 25, and gas tube 26 respectively. Water tubes 24 and 25, in turn, are connected to water passageways, not shown, in head insert assembly 22, and gas conduit 26 is connected to passageway 23. Enclosing a semi-circular reduced diameter portion 27 of the head insert assembly 22 is a generally tubular saddle housing 30. An electrically conducting wire guide tube 31, providing power contact for the wire and for guiding the wire through the torch head to the welding zone, is centrally mounted within the head 11 by means of a set screw 34 and a saddle block 33. As shown in FIG. 1, the block 33 is tightened by set screw 34 against guide tube 31 to place it in efficient contact with portion 27 of the head insert assembly.

Shielding gas such as argon, helium or carbon dioxide from a suitable source (not shown), is received in passageway 23 via conduit 17 and tube 26, and is then uniformly distributed about the arc (not shown) by means of a gas distribution nozzle 35 encircling the wire guide tube 31 between gas tube 26 and the downstream end of the guide tube. The gas distribution nozzle 35, as shown in FIG. 4, is provided with a central passageway 36 to snugly receive the wire guide tube and a plurality of mutually spaced slots 37 around its circumference. When gas distribution nozzle 35 is mounted in the torch head 11, its slots 37 extend along the longitudinal axis of the head 11, and together with the inner wall of the head insert assembly 22 provide a uniformly spaced system of passageways for the shielding gas to be distributed about the arc. The gas distribution nozzle 35 has the further function of preventing spatter from the welding zone from entering the interior of the torch head.

The head 11 is provided with a head insulator 40 which is secured to head insert assembly 22 by a plurality of screws 42. A gasket 41 separates insulator 40 from assembly 22. The torch 10 is also provided with a nozzle 43 having an annular cooling chamber (not shown) connected to the water tubes 24 and 25 by means of water passages (not shown) in head insert assembly 22. The nozzle 43 is secured to the torch head by means of a nozzle nut 44.

The cable of switch and cable assembly 20 is connected to a suitable welding control unit (not shown) having a suitable wire drive motor (not shown) all enclosed within a housing 45, to which is attached a suitable wire drive unit 46, no details of which are shown. Mounted on the housing 45 is a wire reel 47 constituting a source of welding electrode. The drive unit 46 provides means to draw electrode 50 from the reel 47 and to drive it through a preferably flexible wire conduit 51 to the torch 10. The conduit 51 is provided with a shank portion 49 at its downstream end.

There is provided manually operable means for quickly connecting the conduit 51 to the torch 10 comprising a connector cap assembly or connector 52. The connector cap assembly 52 includes a bushing 53 which is enclosed by a connector cap insulator 54 of suitable nonconducting material, for example, nylon. The bushing 53 has an inside diameter such as to adapt bushing 53 to freely fit over and turn about the conduit shank 49. The connector 52 is rotatably mounted on the end of the conduit 51 by means of a set screw 48 which passes through insulator 54 and bushing 53 and extends into a peripheral groove 56 in the shank end 49 of the conduit 51. However, the set screw 48 does not engage the bottom surface of groove 56. Therefore the connector 52 freely rotates about the longitudinal axis of the conduit 51 but is restrained from movement along the longitudinal axis of the conduit by the cooperation of the set screw 48 with the walls of the groove 56.

The torch head 11 is provided with a conformation for connecting the head 11 to the conduit 51 comprising a pin 60 suitably mounted in the saddle housing 30 and projecting inward from its inside wall. The pin 60 may advantageously be in the form of a screw. The conduit connector 52 and its bushing 53 have a conformation for cooperation with the pin 60 comprising a slot 61 extending along the longitudinal axis of the bushing 53, and a communicating groove 62 extending around the periphery of the downstream end of bushing 53 (see FIGS. 1, 2 and 3). The groove 62 is formed in eccentric relation to the axis of rotation of the connector 52 as best shown in FIG. 2. In the illustrated embodiment the desired results have been obtained by forming groove 62 about a center aligned with slot 61 and offset from the longitudinal axis of bushing 53 by about 0.017 inch. The relationship between the pin 60, slot 61, and groove 62 is such that when slot 61 is placed in registration with pin 60, (alignment of slot 61 with pin 60 is accomplished by appropriate rotation of connector 52) the connector 52 can then be advanced relative to the longitudinal axis of head 11 to place pin 60 in groove 62. This mode of operation is illustrated in FIG. 3. The radius of the bottom surface of groove 62 and the disposition of pin 60 are such that the cam-like bottom surface 63 of groove 62 and pin 60 are out of engagement at slot 61. However, as best shown in FIG. 2, due to the eccentric relation of the groove 62 to the axis of rotation of connector 52, the pin 60 and groove surface 63 are engageable by turning connector 52 to releasably lock the conduit to the torch. In the illustrated embodiment the conduit 51 may be releasably locked to the torch 10 by rotating the connector 52 about a quarter turn from the position in which slot 61 is aligned with pin 60.

Referring now to the mode of operation of the invention, when the operator wishes to start welding, assuming that there is electrode in conduit 51 and that connector 52 is not connected to head 11, the operator operates appropriate controls (not shown) to cause about 6" of electrode to extend beyond the connector 52. The operator may then feed the electrode 50 into the tube 31 by hand. The operator then aligns connector slot 61 with pin 60 by appropriately rotating the connector 52. The connector 52 is then advanced to place groove 62 about pin 60 (see FIG. 3). The wire conduit 51 may then be releasably locked to the head 11 merely by rotating the connector 52 through approximately a quarter turn to place surface 63 in engagement with the pin 60.

The operator then commences welding by operating the trigger switch button 21 on the handle portion 12, energizing the welding circuit through a relay, not shown, in the control housing. As welding progresses, if a jam occurs in the conduit 51 or in the wire guide tube 31 due to irregularities in the electrode, kinks, metal shavings, etc., the operator releases button 21 preventing further movement of the electrode, and then disconnects the connector 52 from the torch head 11 merely by turning connector 52 one quarter turn to place the slot 61 in alignment with pin 60 and separating the conduit from the torch head. This disconnect operation may thus be accomplished in a matter of a few seconds because disconnection is by a simple manual operation without the use of tools. After the jam is cleared, the conduit and torch connection is reestablished as discussed above.

While there has been described what is at present considered to be the preferred embodiment of the invention, it will be understood that various modifications may be made therein and are intended to be included within the scope of the appended claims.

The invention claimed is:

1. In electrical arc welding apparatus, the combination comprising, a semi-automatic consumable electrode welding torch, said torch having a handle and a head, said head having means for guiding electrode to a welding zone, a source of welding electrode, means for driving electrode from said source to the welding zone, a conduit for transferring electrode from said source to said head, a connector rotatably carried on said conduit for connecting said conduit to said head, and manually operable means for connecting said connector to said head without the use of tools, said means including a groove on the periphery of said connector and a pin carried on said head, said groove and said pin being mutually engageable into releasably connected relation by manually rotating said connector relative to said head.

2. In electrical arc welding apparatus, the combination comprising, a consumable electrode welding torch, said torch having a handle and a head, said head including means for guiding electrode to a welding zone, a source of welding electrode, a conduit for carrying electrode from said source to said head, a connector rotatably carried on said conduit for connecting said conduit to said head, and manually operable means for connecting said connector to said head without the use of tools, said means including a groove formed on the periphery of said connector in eccentric relation to the axis of rotation of said connector, and a pin carried by said head, a portion of the bottom surface of said groove and said pin being mutually engageable into releasably connected relation by manually rotating said connector in relation to said head.

3. In electrical arc welding apparatus, a gas shielded consumable electrode welding torch having a through passageway for electrode, a shielding gas conduit connected to a shielding gas source and to said passageway, a source of welding electrode, an electrode conduit in communication with said electrode source, manually operable means for quickly connecting said electrode conduit to said torch without the use of tools including a pin fixedly carried by said torch, and a rotatable connector mounted on said conduit having a cam surface eccentric to the axis of rotation of said connector adapted for engagement with said pin on a partial rotation of said connector, and means for directing the flow of shielding gas through said passageway and for uniformly distributing it about a welding zone, said flow directing means comprising a nozzle mounted in said passageway downstream of said gas conduit, said nozzle having a plurality of annularly spaced longitudinally extending slots therein providing gas passages between said electrode passageway and the welding zone.

4. In electrical arc welding apparatus, the combination comprising, a consumable electrode welding torch, said torch having a handle and a head, said head having means for guiding electrode to a welding zone, a source of welding electrode, an electrode conduit connected to said source for carrying electrode from said source to said head, and manually operable means for quickly connecting said conduit to said head without the use of tools, said means including cooperating interfitting conformations respectively on said conduit and said head mutually engageable into releasable connected relation by aligning said cooperating conformations radially, moving said conduit conformation relative to the head conformation along the longitudinal axis of said conduit until said conformations are in longitudinal registration, and then manually turning said conduit conformation circumferentially relative to said head conformation merely a portion of a turn.

5. In electric arc welding apparatus, a consumable welding electrode, a conduit for carrying said electrode, and quick-connection means for connecting said conduit to tubular means for transferring said electrode comprising, a connector, mounting means for mounting said connector on an end portion of said conduit, said mounting means permitting manual rotation of said connector in a circular path relative to said conduit, but restraining movement of said connector along the longitudinal axis of said conduit, said connector having wall means forming a cam surface eccentric to the axis of rotation of said connector, a portion of said cam surface being adapted to receive without interference a pin mounted in the tubular means in fixed relation therewith and due to the eccentricity of said cam surface another portion of said cam surface being engageable with the pin on rotation of said connector a portion of a turn relative to the pin, whereby said conduit may quickly be releasably connected to tubular means for transferring electrode merely by placing the conduit and the tubular means in registration and then rotating said connector a portion of a turn to lock the conduit and the tubular means in connected relation.

6. In electric arc welding apparatus as claimed in claim 5 in which said cam surface forms the bottom of a peripheral groove in said wall means, and said wall means has an axial slot extending to an external portion thereof and communicating with said groove adapted to receive a pin mounted on tubular means for transferring electrode, the walls of said groove cooperating with the pin to prevent longitudinal movement between the conduit and the tubular means, and the slot affording the pin access to the groove.

7. In electric arc welding apparatus, the combination comprising, a consumable electrode welding torch, said torch including means for guiding an electrode to a welding zone, a pin fixedly carried by said torch, a source of welding electrode, a conduit for transferring electrode from said source to said torch, and means for quickly connecting said conduit into releasable locked engagement with said torch including a rotatable connector attached to said conduit, said connector having wall means forming a circumferentially extending peripheral groove wide enough to accommodate said pin, and a slot in communication with said groove adapted to receive said pin extending axially to an external portion of said wall means to afford the pin access to said groove to place them in registration, the bottom of said groove being a cam surface eccentric to the axis of rotation of said connector, and the side walls of said groove enclosing at least a portion of said pin to restrain longitudinal movement of said conduit relative to said torch, the portion of said cam surface adjacent said slot being adapted to freely receive said pin without interference, and due to the eccentricity of said cam surface another portion thereof being engageable with a portion of said pin by rotating said connector a portion of a turn to place said connector and said pin in releasable locked engagement, so that when said pin and said groove are in registration said head may be placed in releasable locked engagement with said conduit merely by rotating said connector a portion of a turn.

References Cited in the file of this patent

UNITED STATES PATENTS

| | | |
|---|---|---|
| 2,344,775 | Holslag | Mar. 21, 1944 |
| 2,628,301 | Dahl | Feb. 10, 1953 |
| 2,727,970 | Turbett | Dec. 20, 1955 |
| 2,754,395 | Scheller | July 10, 1956 |
| 2,768,280 | Renaudie | Oct. 23, 1956 |
| 2,903,567 | Piekarski et al. | Sept. 8, 1959 |
| 2,960,598 | Verhaeghe et al. | Nov. 15, 1960 |